United States Patent
Luo et al.

(10) Patent No.: US 11,388,778 B2
(45) Date of Patent: Jul. 12, 2022

(54) TIME CONFIGURATION METHOD, NETWORK DEVICE, AND UE

(71) Applicant: Huawei Technologies Co., Ltd., Shenzhen (CN)

(72) Inventors: Jun Luo, Kista (SE); Keyvan Zarifi, Ottawa-Kanata (CA); Kelvin Kar Kin Au, Shenzhen (CN); Zhengzheng Xiang, Shanghai (CN); Jin Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

(21) Appl. No.: 16/784,628

(22) Filed: Feb. 7, 2020

(65) Prior Publication Data
US 2020/0214082 A1 Jul. 2, 2020

Related U.S. Application Data

(63) Continuation of application No. PCT/CN2018/098902, filed on Aug. 6, 2018.

(30) Foreign Application Priority Data

Aug. 10, 2017 (CN) .......................... 201710682218.3

(51) Int. Cl.
*H04W 88/06* (2009.01)
*H04W 76/28* (2018.01)
(Continued)

(52) U.S. Cl.
CPC .......... *H04W 88/06* (2013.01); *H04B 7/0626* (2013.01); *H04L 5/0048* (2013.01);
(Continued)

(58) Field of Classification Search
None
See application file for complete search history.

(56) References Cited

U.S. PATENT DOCUMENTS

2010/0208660 A1* 8/2010 Ji ...................... H04W 52/0225
370/328
2012/0063399 A1* 3/2012 Kiyoshima ........... H04L 5/0019
370/329

(Continued)

FOREIGN PATENT DOCUMENTS

CN 101953213 A 1/2011
CN 102257859 A 11/2011
(Continued)

OTHER PUBLICATIONS

Author Unknown, NR C-DRX Operations with Beam Management, Doc. No. R2-1701994, pp. 1-5, Feb. 17, 2017.*
(Continued)

*Primary Examiner* — Christopher M Crutchfield
(74) *Attorney, Agent, or Firm* — Slater Matsil, LLP

(57) ABSTRACT

This application provides a time configuration method, a network device, and a terminal. A sending time of a reference signal is determined according to an on duration period, or an on duration period is determined according to a sending time of a reference signal, so that the sending time of the reference signal is associated with the on duration period.

16 Claims, 12 Drawing Sheets

(51) Int. Cl.
  *H04B 7/06* (2006.01)
  *H04L 5/00* (2006.01)
  *H04W 72/04* (2009.01)
  *H04W 24/10* (2009.01)
  *H04W 52/02* (2009.01)

(52) U.S. Cl.
  CPC ........... *H04L 5/0051* (2013.01); *H04W 24/10* (2013.01); *H04W 52/0212* (2013.01); *H04W 72/042* (2013.01); *H04W 76/28* (2018.02); *Y02D 30/70* (2020.08)

(56) References Cited

U.S. PATENT DOCUMENTS

| | | | |
|---|---|---|---|
| 2012/0257522 A1 | 10/2012 | Adachi et al. | |
| 2013/0034035 A1 | 2/2013 | Kazmi et al. | |
| 2013/0034064 A1* | 2/2013 | Nam | H04L 5/0091 370/329 |
| 2013/0242778 A1 | 9/2013 | Geirhofer et al. | |
| 2013/0308533 A1* | 11/2013 | Murakami | H04W 52/0216 370/328 |
| 2014/0010131 A1 | 1/2014 | Gaal et al. | |
| 2017/0251518 A1* | 8/2017 | Agiwal | H04W 76/28 |
| 2018/0310284 A1* | 10/2018 | Zeng | H04W 72/042 |
| 2019/0058532 A1* | 2/2019 | Nagaraja | H04L 5/0053 |
| 2019/0059054 A1* | 2/2019 | Lee | H04L 5/0051 |
| 2019/0254110 A1* | 8/2019 | He | H04L 5/0048 |
| 2019/0297577 A1* | 9/2019 | Lin | H04W 52/0229 |
| 2020/0008261 A1* | 1/2020 | Islam | H04W 52/0216 |
| 2020/0205219 A1* | 6/2020 | Chen | H04W 76/19 |

FOREIGN PATENT DOCUMENTS

| | | |
|---|---|---|
| CN | 105939536 A | 9/2016 |
| CN | 106662634 A | 5/2017 |
| WO | 2014149062 A1 | 9/2014 |
| WO | 2017097567 A1 | 6/2017 |
| WO | 2017117424 A1 | 7/2017 |
| WO | 2017132212 A1 | 8/2017 |

OTHER PUBLICATIONS

Author Unknown, WF on CSI-RS configuration for C-DRX UE, Doc. No. R1-1715030, pp. 1-3 Aug. 25, 2017.*
Author Unknown, C-DRX Beam Management Aspects, Doc. No. R1-1701187, pp. 1-3, Aug. 25, 2017.*
Author Unknown, Way forward for NR C-DRX, Doc. No. R1-1701291, pp. 1-2, Feb. 17, 2017.*
Author Unknown, C-DRX enhancement in NR, Doc. No. R2-1704785, pp. 1-6, May 19, 2017.*

* cited by examiner

TIME CONFIGURATION METHOD, NETWORK DEVICE, AND UE

CROSS-REFERENCE TO RELATED APPLICATIONS

This application is a continuation of International Application No. PCT/CN2018/098902, filed on Aug. 6, 2018, which claims priority to Chinese Patent Application No. 201710682218.3, filed on Aug. 10, 2017. The disclosures of the aforementioned applications are hereby incorporated by reference in their entireties.

TECHNICAL FIELD

This application relates to the field of communication technologies, and in particular, to a time configuration method, a network device, and UE.

BACKGROUND

A downlink signal-based measurement manner is used in a radio resource management (RRM) method in an existing long term evolution (LTE) system. To be specific, a network device sends a downlink reference signal, for example, a cell-specific reference signal (CRS) in a fixed time-frequency position, a terminal device measures a measurement result such as reference signal received power (RSRP)/reference signal received quality (RSRQ) of the CRS sent by the network device and reports the measurement result to the network device, and the network device determines handover and movement of the terminal device. In a next generation wireless communications system (NR), for mobility of UE, the UE may be configured to perform measurement by using a channel state information-reference signal (CSI-RS). CSI-RSs in different cells do not need to be sent in one measurement window, in other words, sending times are different. However, discontinuous reception (DRX) UE periodically wakes up, and reads a PDCCH signal, paging information, and another operation in an on duration period, to reduce power consumption. However, in an off duration period, the UE stops monitoring the PDCCH signal and even disables a transceiver, to save energy. In this case, the UE cannot receive a CSI-RS or needs to consume extra power to receive the CSI-RS.

SUMMARY

This application provides a time configuration method, a network device, and a terminal. A sending time of a reference signal is determined according to an on duration period, or an on duration period is determined according to a sending time of a reference signal, so that the sending time of the reference signal is associated with the on duration period, to avoid a technical problem that UE cannot receive the reference signal, or UE needs to frequently wake up to receive the reference signal. That the sending time of the reference signal is associated with the on duration period may include: The sending time is within the on duration period; the sending time partially overlaps with the on duration period; sending times and on duration periods are regularly spaced; and the like. It should be understood that a technical problem that the UE cannot receive the reference signal or power consumption of the UE is large can be resolved to some extent provided that a relationship is established between the sending time and the on duration period. This application mainly describes a case in which the sending time is within the on duration period. A person skilled in the art may understand that for a case of another relationship, reference may also be made to description in this application. Details are not described in this application.

According to a first aspect, a time configuration method is provided. The method includes: determining, by a network device, a sending time of a reference signal according to an on duration period of user equipment UE; and sending, by the network device, the reference signal to the UE.

In a possible implementation of the first aspect, the on duration period of the UE includes one or more of the following: an on duration period of at least one of all UEs that need to receive the reference signal; an on duration period of each of all the UEs that need to receive the reference signal; an overlapping on duration period of at least two of all the UEs that need to receive the reference signal; an on duration period of each UE in at least one group of UEs that need to receive the reference signal; and an overlapping on duration period of at least two UEs in the at least one group of UEs that need to receive the reference signal.

In a possible implementation of the first aspect, the determining, by a network device, a sending time of a reference signal according to an on duration period of user equipment UE includes: determining, by the network device, the sending time of the reference signal according to the on duration period of the UE and a time configuration information table of the reference signal.

In a possible implementation of the first aspect, the determining, by the network device, the sending time of the reference signal according to the on duration period of the UE and a time configuration information table of the reference signal includes: obtaining, by the network device, an intersection of a sending time in the time configuration information table and the on duration period of the UE; and selecting, by the network device, the sending time of the reference signal from the intersection.

In a possible implementation of the first aspect, the sending time is within the on duration period of the UE.

In a possible implementation of the first aspect, that the sending time is within the on duration period of the UE includes one or more of the following: A start point of the sending time is the same as a start point of the on duration period of the UE; an end point of the sending time is the same as an end point of the on duration period of the UE; and the start point of the sending time is after the start point of the on duration period of the UE, and the end point of the sending time is before the end point of the on duration period of the UE.

According to a second aspect, a time configuration method is provided, where the method includes: determining, by a network device, an on duration period of UE according to a sending time of a reference signal; and sending, by the network device, the reference signal to the UE. In a possible implementation of the second aspect, the on duration period of the UE includes an on duration period of at least one of all UEs that need to receive the reference signal or an on duration period of each UE in at least one group of UEs that need to receive the reference signal.

In a possible implementation of the second aspect, the determining, by a network device, an on duration period of UE according to a sending time of a reference signal includes: determining, by the network device, that the on duration period of the UE includes the sending time of the reference signal.

In a possible implementation of the second aspect, that the on duration period of the UE includes the sending time of the reference signal includes one or more of the following: A start point of the on duration period of the UE is the same as a start point of the sending time; an end point of the on duration period of the UE is the same as an end point of the sending time; and the start point of the on duration period of the UE is before the start point of the sending time, and the end point of the on duration period of the UE is after the end point of the sending time.

In a possible implementation of the second aspect, before the determining, by a network device, an on duration period of UE according to a sending time of a reference signal, the method further includes: determining, by the network device, the sending time of the reference signal.

In a possible implementation of the second aspect, the determining, by the network device, the sending time of the reference signal includes: periodically configuring, by the network device, the sending time of the reference signal.

According to a third aspect, a time configuration method is provided, where the method includes: receiving, by UE from a network device, configuration information of an on duration period; and receiving, by the UE from the network device in the on duration period, a reference signal.

In a possible implementation of the third aspect, the on duration period includes a sending time of the reference signal.

In a possible implementation of the first aspect, the second aspect, or the third aspect, the reference signal is a channel state information-reference signal; and/or the UE is discontinuous reception UE.

According to a fourth aspect, a time configuration apparatus is provided. The apparatus includes a determining unit and a sending unit. The determining unit is configured to determine a sending time of a reference signal according to an on duration period of user equipment UE. The sending unit is configured to send the reference signal to the UE.

In a possible implementation of the fourth aspect, the on duration period of the UE includes one or more of the following: an on duration period of at least one of all UEs that need to receive the reference signal; an on duration period of each of all the UEs that need to receive the reference signal; an overlapping on duration period of at least two of all the UEs that need to receive the reference signal; an on duration period of each UE in at least one group of UEs that need to receive the reference signal; and an overlapping on duration period of at least two UEs in the at least one group of UEs that need to receive the reference signal.

In a possible implementation of the fourth aspect, the determining unit is specifically configured to determine the sending time of the reference signal according to the on duration period of the UE and a time configuration information table of the reference signal.

In a possible implementation of the fourth aspect, the determining unit is specifically configured to: obtain an intersection of a sending time in the time configuration information table and the on duration period of the UE; and select the sending time of the reference signal from the intersection.

In a possible implementation of the fourth aspect, the sending time is within the on duration period of the UE.

In a possible implementation of the fourth aspect, that the sending time is within the on duration period of the UE includes one or more of the following: A start point of the sending time is the same as a start point of the on duration period of the UE; an end point of the sending time is the same as an end point of the on duration period of the UE; and the start point of the sending time is after the start point of the on duration period of the UE, and the end point of the sending time is before the end point of the on duration period of the UE.

According to a fifth aspect, a time configuration apparatus is provided. The apparatus includes a determining unit, configured to determine an on duration period of UE according to a sending time of a reference signal; and a sending unit, configured to send the reference signal to the UE.

In a possible implementation of the fifth aspect, the on duration period of the UE includes an on duration period of at least one of all UEs that need to receive the reference signal or an on duration period of each UE in at least one group of UEs that need to receive the reference signal.

In a possible implementation of the fifth aspect, the determining unit is specifically configured to determine that the on duration period of the UE includes the sending time of the reference signal.

In a possible implementation of the fifth aspect, that the on duration period of the UE includes the sending time of the reference signal includes one or more of the following: A start point of the on duration period of the UE is the same as a start point of the sending time; an end point of the on duration period of the UE is the same as an end point of the sending time; and the start point of the on duration period of the UE is before the start point of the sending time, and the end point of the on duration period of the UE is after the end point of the sending time.

In a possible implementation of the fifth aspect, the determining unit is further configured to determine the sending time of the reference signal.

In a possible implementation of the fifth aspect, the determining unit is specifically configured to periodically configure the sending time of the reference signal.

According to a sixth aspect, a time configuration apparatus is provided. The apparatus includes a receiving unit, and the receiving unit is configured to: receive configuration information of an on duration period from a network device; and receive, in the on duration period, a reference signal from the network device.

In a possible implementation of the fourth aspect, the fifth aspect, or the sixth aspect, the reference signal is a channel state information-reference signal; and/or the UE is discontinuous reception UE.

According to a seventh aspect, a network device is provided. The network device includes a memory, a processor, a receiver, and a transmitter. The memory stores an instruction, and when the instruction is executed by the processor, the processor is configured to instruct the transmitter to perform the method in the first aspect or the second aspect.

According to an eighth aspect, UE is provided. The UE includes a memory, a processor, and a transceiver. The memory stores an instruction, and when the instruction is executed by the processor, the processor is configured to instruct the transceiver to perform the method in the third aspect.

According to a ninth aspect, a computer readable storage medium is provided. The computer readable storage medium includes an instruction, and when the instruction is run on a computer, the computer is enabled to perform the method in any one of the first aspect, the second aspect, or the third aspect.

According to a tenth aspect, a program product is provided. The program product includes an instruction, and when the instruction is run on a computer, the computer is enabled to perform the method in any one of the first aspect, the second aspect, or the third aspect.

BRIEF DESCRIPTION OF THE DRAWINGS

To describe the technical solutions in this application more clearly, the following briefly describes the accompanying drawings required for describing the embodiments. Apparently, the accompanying drawings in the following description show some embodiments of this application, and a person of ordinary skill in the art may still derive other drawings from these accompanying drawings without creative efforts.

DETAILED DESCRIPTION OF ILLUSTRATIVE EMBODIMENTS

Figure 1:
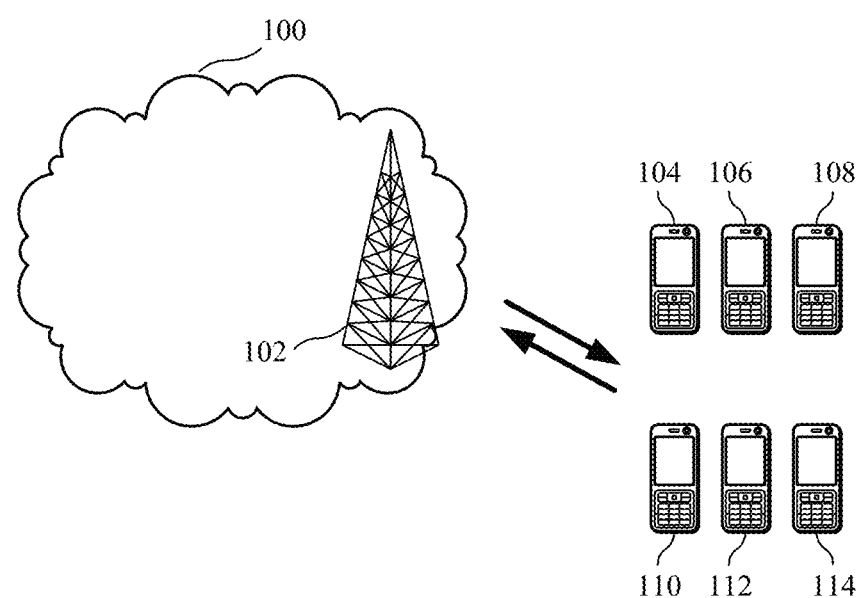
FIG. 1 is a schematic diagram of a system to which this application is applied.

The terms used in this application are merely for the purpose of describing a specific possible implementation, but are not intended to limit this application. The terms "a", "the", and "this" of singular forms used in this application and the appended claims are also intended to include plural forms, unless otherwise specified in a context clearly. It should be further understood that the term "and/or" used in this specification indicates and includes any or all possible combinations of one or more associated listed items. It should be further understood that the term "include" adopted in this specification specifies presence of features, data, information, integers, steps, operations, elements and/or components, with presence or addition of one or more other features, data, information, integers, steps, operations, elements, components, and/or their combinations not excluded.

It should be noted that a sequence of steps in this application may be freely arranged. This is not limited in this application.

The following describes technical solutions in the embodiments of this application with reference to the accompanying drawings.

Some terms in this application are first explained and described to facilitate understanding by a person skilled in the art.

(1) A network device may be any device with a wireless transmitting/receiving function, including but not limited to a network device (for example, a network device NodeB, an evolved network device eNodeB, a network device (gNB) in a 5th generation (5G) communications system, a network device or a network device in a future communications system, or an access node, a wireless relay node, or a wireless backhaul node in a WiFi system) and the like. Alternatively, the network device may be a radio controller in a cloud radio access network (CRAN) scenario. Alternatively, the network device may be a network device in a 5G network or a network device in a future evolved network, or may be a wearable device, a vehicle-mounted device, or the like. Alternatively, the network device 100 may be a small cell, a transmission reception node (TRP), or the like. Certainly, this application is not limited thereto. A network device that currently provides a service for UE may be referred to as a serving network device. The UE receives a broadcast signal from the serving network device, and interacts with a network by using the serving network device.

(2) User equipment (UE) is a device with a wireless transmitting/receiving function, and may interact with a network device. The user equipment may be deployed on land and include an indoor or outdoor device, a handheld device, a wearable device, or a vehicle-mounted device, or may be deployed on a water surface (for example, a chip), or may be deployed in the air (for example, on an airplane, a balloon, or a satellite). The UE may be a mobile phone (mobile phone), a tablet computer (Pad), a computer with a wireless transmitting/receiving function, a virtual reality (VR) UE device, an augmented reality (AR) UE device, wireless UE in industrial control, wireless UE in self driving, wireless UE in remote medical, wireless UE in a smart grid, wireless UE in transportation safety, wireless UE in a smart city, wireless UE in a smart home, or the like. An application scenario is not limited in the embodiments of this application. The UE may be a device that can communicate with the network device. The UE may also be referred to as a terminal device, an access terminal device, a UE unit, a UE station, a mobile station, a mobile console, a remote station, a remote terminal device, a mobile device, a wireless communications device, a UE proxy, a terminal apparatus, or the like sometimes.

(3) Cell: A network device provides a service for the cell, and a terminal device communicates with the network device by using a transmission resource (for example, a frequency domain resource or a spectrum resource) used in the cell. The cell may be a cell corresponding to the network device (for example, a base station). The cell may belong to a macro base station or may belong to a base station corresponding to a small cell. The small cell herein may include a metro cell, a micro cell, a pico cell, a femto cell, and the like. These small cells are characterized by a small coverage area and low transmit power, and are used to provide a high-rate data transmission service. In addition, the cell may be further a hyper cell. The cell further includes a serving cell and a neighboring cell. The serving cell is a cell that currently provides a service for UE, and the neighboring cell is a cell adjacent to or close to the serving cell.

(4) Interaction: The interaction in this application refers to a process in which two interaction parties transfer information to each other. The transferred information herein may be the same or different. For example, the two interaction parties are a network device 1 and a network device 2, or may be a network device and UE. The network device 1 may request information from the network device 2, and the network device 2 provides the network device 1 with the information requested by the network device 1. Certainly, the network device 1 and the network device 2 may alternatively request information from each other. Interaction between the network device and the UE is the same as the interaction between the foregoing network devices. Details are not described herein again. The requested information herein may be the same or different.

(5) The term "a plurality of" means two or more, and the term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

(6) Nouns "network" and "system" are usually interchangeably used, but meanings of the nouns can be understood by a person skilled in the art. The terms "information", "signal", "message", and "channel" may be interchangeably used sometimes. It should be noted that expressed meanings are consistent when differences are not emphasized. The terms "of", "relevant", and "corresponding" may be interchangeably used sometimes. It should be noted that expressed meanings are consistent when differences are not emphasized.

The following describes the technical solutions in this application with reference to the accompanying drawings.

FIG. 1 is a schematic diagram of a system to which this application is applied. As shown in FIG. 1, the system 100 may include a network device 102 and terminal devices 104, 106, 108, 110, 112, and 114. The network device and the terminal devices are wirelessly connected to each other. It should be understood that FIG. 1 is described only by using an example in which the system includes one network device. However, this application is not limited thereto. For example, the system may alternatively include more network devices. Similarly, the system may alternatively include more terminal devices. It should be further understood that the system may also be referred to as a network. This is not limited in this application.

Figure 2:
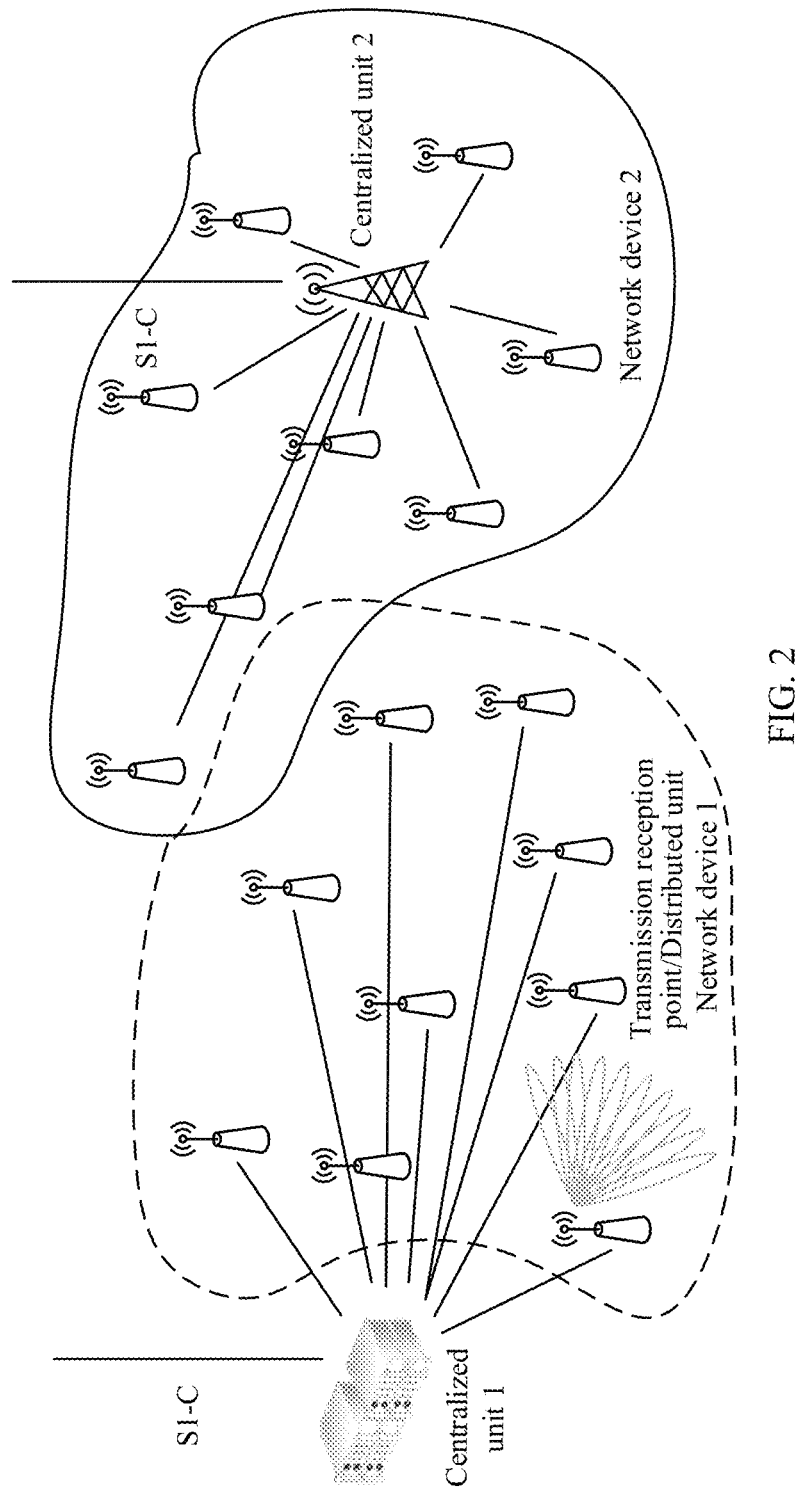
FIG. 2 is a schematic diagram of an example of a network architecture to which this application may be applied.
Figure 3A:
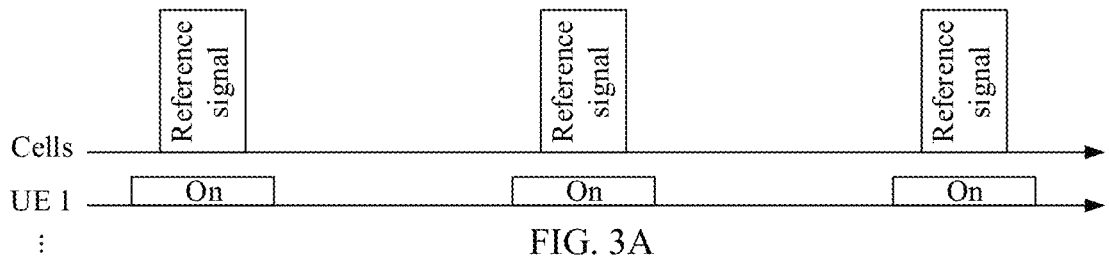
FIG. 3A, FIG. 3B, FIG. 3C, and FIG. 3D are a schematic diagram of an on duration period of UE and a reference signal in this application.
Figure 3B:
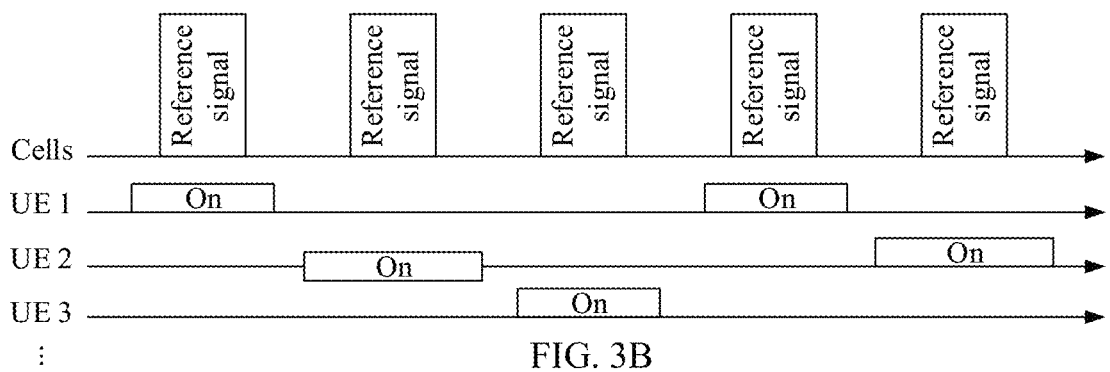
Figure 3C:
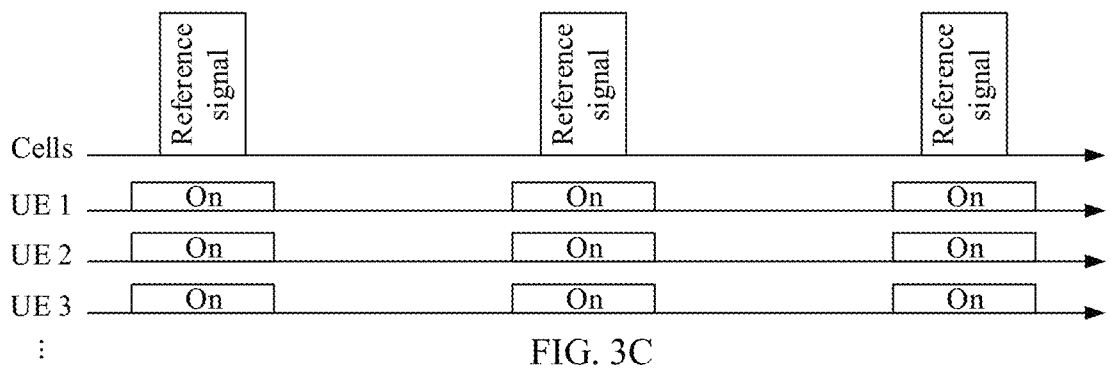
Figure 3D:
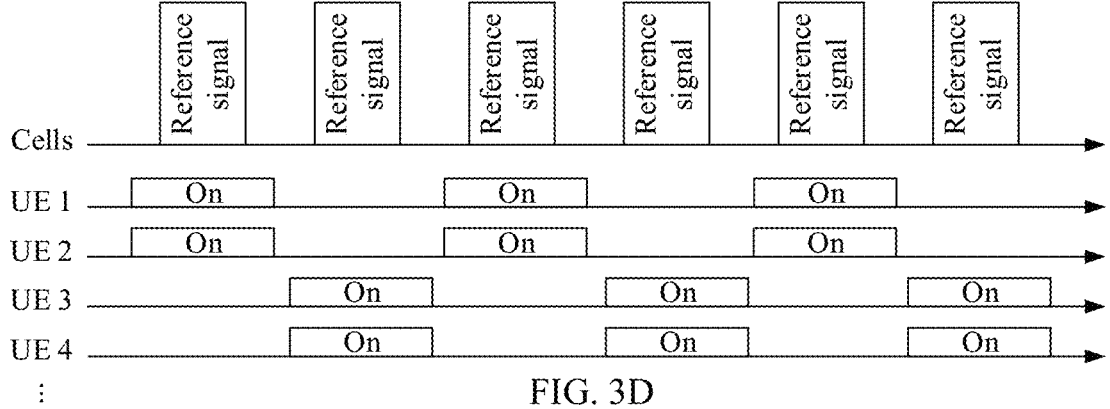

FIG. 2 is a schematic diagram of an example of a network architecture to which this application may be applied. The schematic diagram of the network architecture may be a diagram of a network architecture in NR in a next generation wireless communications system. In the schematic diagram of the network architecture, a network device may be divided into a centralized unit (CU) and a plurality of transmission reception points (TRP)/distributed units (DU). In other words, a bandwidth based unit (BBU) of the network device is reconstructed as DU and CU function entities. It should be noted that forms and quantities of centralized units and TRPs/DUs do not constitute a limitation on this application. Although forms of centralized units respectively corresponding to a network device 1 and a network device 2 shown in FIG. 2 are different, functions of the network device 1 and the network device 2 are not affected. It may be understood that a centralized unit 1 and TRPs/DUs in a dashed line range are composing elements of the network device 1, a centralized unit 2 and TRPs/DUs in a solid line range are composing elements of the network device 2, and the network device 1 and the network device 2 are network devices (or referred to as base stations) in the NR system. The CU can process a radio upper-layer protocol stack function, for example, a radio resource control (RRC) layer and a packet data convergence protocol (PDCP) layer, and can even support some core network functions in sinking to an access network. A network in which the core network functions sink to the access network is referred to as an edge computing network, to meet a higher network latency requirement of a future communications network for an emerging service such as video, online shopping, and virtual/augmented reality. The DU can mainly process a physical layer function and a layer 2 function with a relatively high real-time requirement. Considering transmission resources of a radio remote unit (RRU) and the DU, some physical layer functions of the DU may be moved up to the RRU. With miniaturization of the RRU, a more radical DU may be combined with the RRU. CUs can be deployed in a centralized manner. Deployment of DUs depends on an actual network environment. In an area with higher traffic density, a smaller inter-site distance, and limited equipment room resources, for example, a core urban area, a university, and a large-scale performance venue, DUs may also be deployed in a centralized manner. However, in an area with lower traffic density, a larger inter-site distance, and the like, for example, a suburb and a mountainous area, DUs may be deployed in a distributed manner. An S1-C interface shown in FIG. 2 may be a standard interface between a network device and a core network, and a specific device connected to the S1-C is not shown in FIG. 2.

In the NR, it may be configured that UE performs mobility measurement by using a CSI-RS, and in addition, a sending time of the CSI-RS is associated with an on duration period of the UE, to reduce a possibility of measurement failure and reduce power consumption. The on duration period may be referred to as an on duration period, on duration, or an on period. For example, it is assumed that the UE measures three cells (A/B/C), and the cell A is a serving cell (serving cell) of the UE. The cell A (or a network device, or a network device using the cell A) sends configuration information of CSI-RSs in the three cells to the UE, and the UE obtains the configuration information of the CSI-RSs in the three cells. The configuration information includes sending times of the CSI-RSs (namely, sending times of reference signals). The UE receives the CSI-RSs in the three cells at a corresponding sending time on a time frequency resource. In this application, the sending times of the CSI-RSs in the three cells are within the on duration period of the UE. The UE may be connected mode DRX UE (C-DRX UE).

The following describes a specific solution for determining a sending time of a reference signal according to an on duration period. The determined sending time is sent to UE by using configuration information. Then, a network device sends the reference signal at the sending time, and the UE receives the reference signal at the sending time. Before the specific solution is described, for ease of understanding, an on duration period of the UE and various cases in which the sending time is within the on duration period and the like are first described.

FIG. 3 is a schematic diagram of an on duration period of UE and a reference signal in this application. FIG. 3 shows an on duration period of at least one of all UEs that need to receive the reference signal, where on refers to an on duration period of each UE. FIG. 3A, FIG. 3B, FIG. 3C, and FIG. 3D are merely examples. It should be understood that more or fewer UEs may exist in this application. FIG. 3A shows an on duration period of one UE, namely, UE 1, in all the UEs that need to receive the reference signal. FIG. 3B shows on duration periods of three of all the UEs that need to receive the reference signal, where the on duration periods of UE 1, UE 2, and UE 3 are different. It should be understood that the three UEs may be all the UEs that need to receive the reference signal. FIG. 3C shows on duration periods of two of all the UEs that need to receive the reference signal, where the on duration periods of UE 1 and UE 2 are the same. Correspondingly, only one reference signal may be configured in a same on duration period. FIG. 3D shows on duration periods of four of all the UEs that need to receive the reference signal, where on duration periods of UE 1 and UE 2 are the same, and on duration periods of UE3 and UE4 are the same. In this case, the UE 1 and the UE 2 may be considered as one group, and the UE3 and the UE4 may be considered as one group. A network device may perform grouping according to a preset rule. A specific grouping rule may be as follows: UEs whose on duration periods are the same or similar are classified into one group, UEs whose geographic locations are close are classified into one group, or UEs whose moving speeds are similar are classified into one group.

Figure 4A:
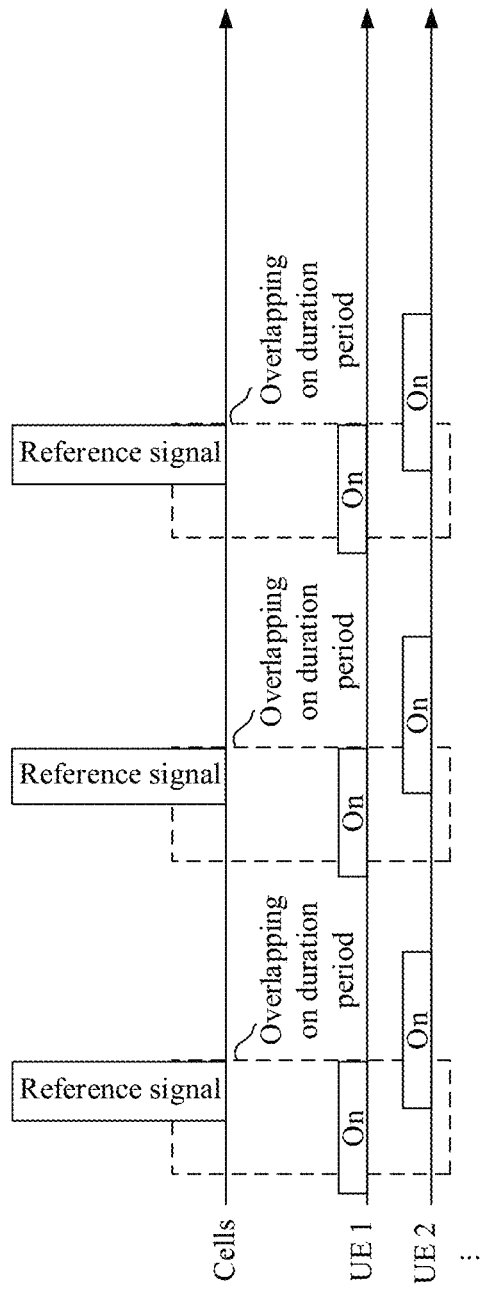
FIG. 4A, FIG. 4B, FIG. 4C, and FIG. 4D are another schematic diagram of an on duration period of UE and a reference signal in this application.
Figure 4B:
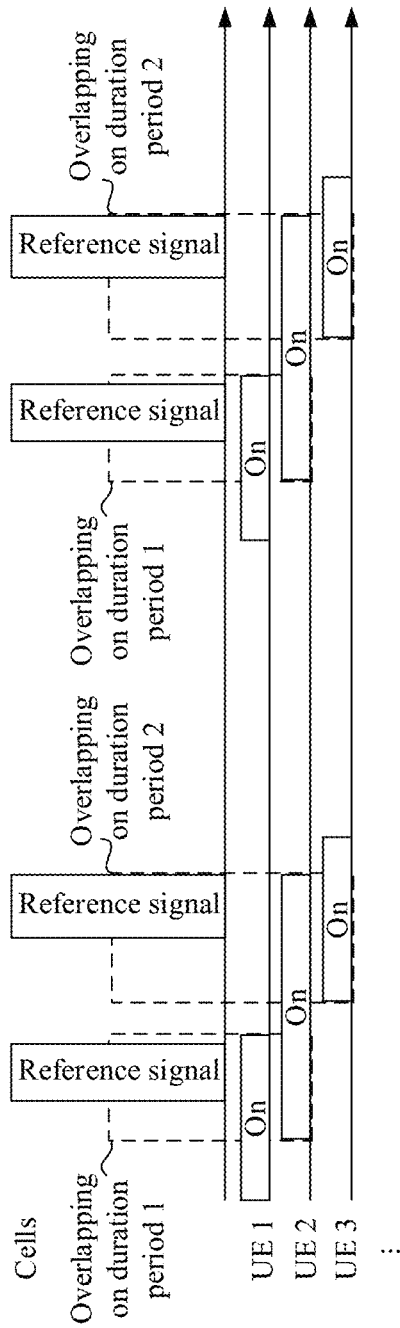
Figure 4C:
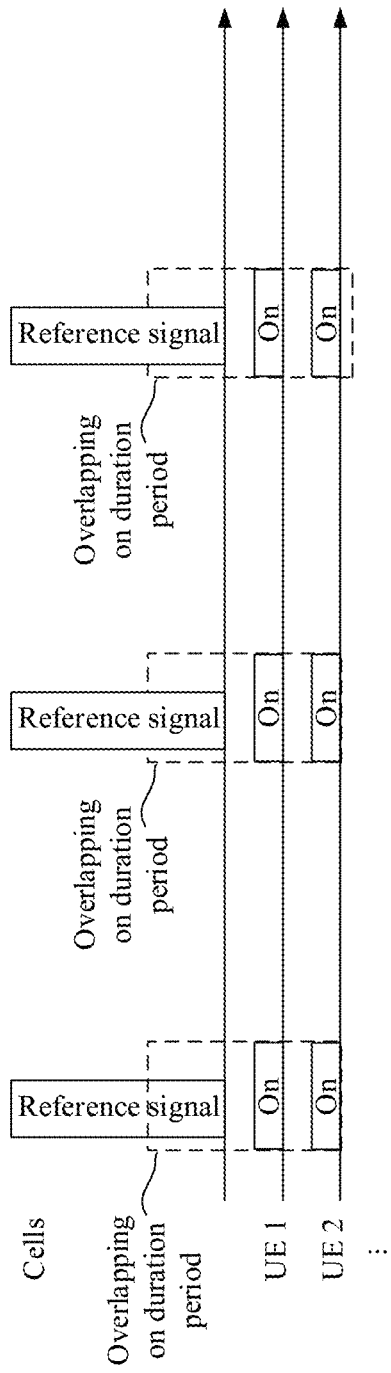
Figure 4D:
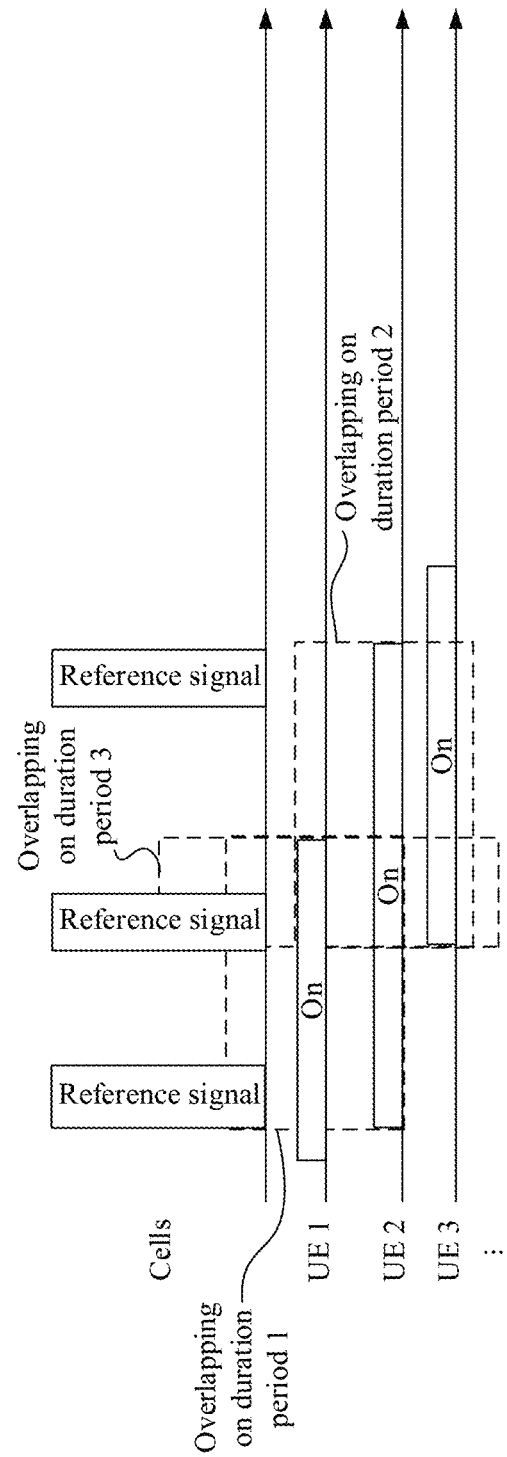

FIG. 4A, FIG. 4B, FIG. 4C, and FIG. 4D are another schematic diagram of an on duration period of UE and a reference signal in this application. FIG. 4A, FIG. 4B, FIG. 4C, and FIG. 4D show an overlapping on duration period of at least two of all UEs that need to receive the reference signal, where on refers to an on duration period of each UE. FIG. 4A, FIG. 4B, FIG. 4C, and FIG. 4D are merely examples. It should be understood that more or fewer UEs may exist in this application. FIG. 4A shows an overlapping on duration period of two of all the UEs that need to receive the reference signal. It can be learned from the figure that on duration periods of the two UEs partially overlap. FIG. 4C shows an overlapping on duration period of two of all the UEs that need to receive the reference signal, where on duration periods of UE 1 and UE 2 fully overlap. UEs whose on duration periods fully overlap may be considered as one group, and a grouping rule for the UEs is the same as that in the description in FIG. 3A, FIG. 3B, FIG. 3C, and FIG. 3D. FIG. 4B shows overlapping on duration periods for three of all the UEs that need to receive the reference signal, where an overlapping on duration period includes an overlapping on duration period 1 of UE 1 and UE 2 and an overlapping on duration period 2 of the UE 2 and UE 3. The overlapping on duration period in this application may include either of the overlapping on duration period 1 and the overlapping on duration period 2, or both the overlapping on duration period 1 and the overlapping on duration period 2. FIG. 4D shows an overlapping on duration period for three of all the UEs that need to receive the reference signal, where the overlapping on duration period may include an overlapping on duration period of two UEs, for example, either of an overlapping on duration period 1 and an overlapping on duration period 2, or an overlapping on duration period 3 of the three UEs. This is not limited in this application.

Figure 5A:
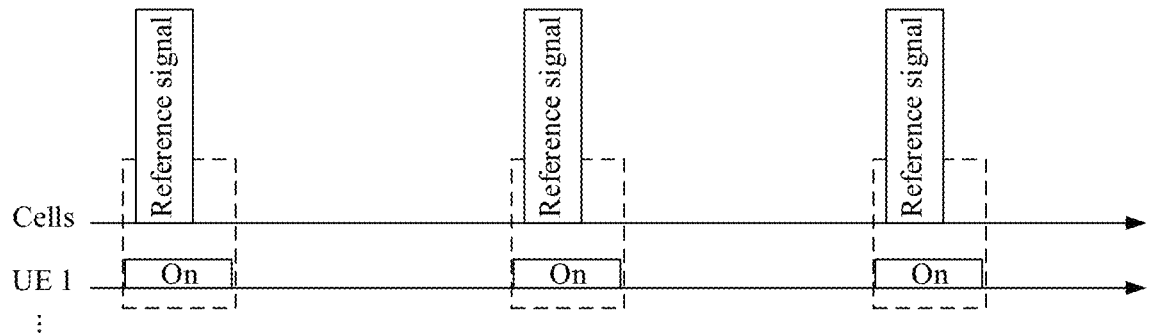
FIG. 5A, FIG. 5B, and FIG. 5C are a schematic diagram of a relationship between a sending time of a reference signal and an on duration period of UE.
Figure 5B:
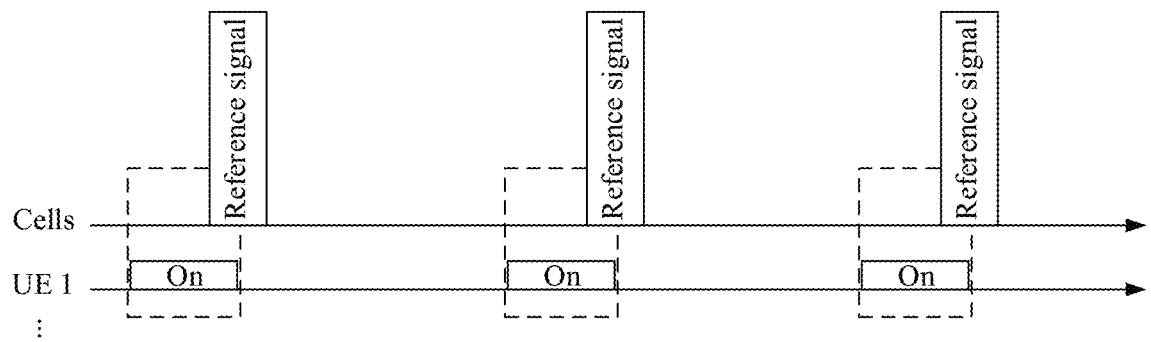
Figure 5C:
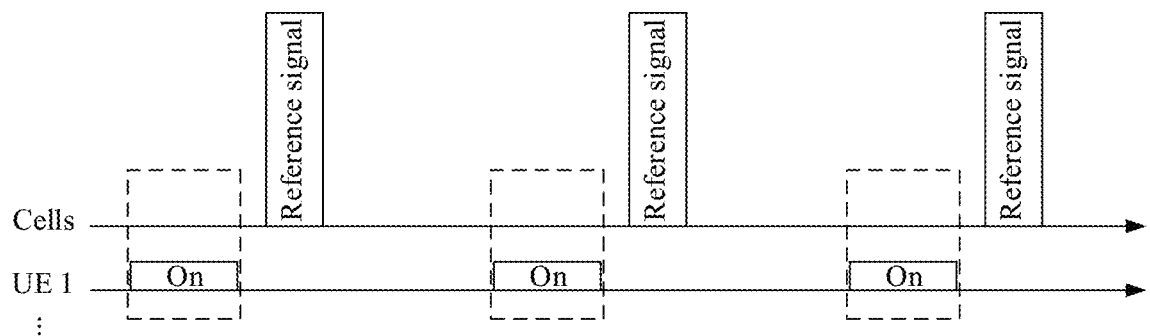

FIG. 5A, FIG. 5B, and FIG. 5C are a schematic diagram of a relationship between a sending time and an on duration period of UE. For brief description, FIG. 5A, FIG. 5B, and FIG. 5C show an example of the relationship between the sending time and the on duration period only by using FIG. 3A as an example. It should be understood that the relationship between the sending time and the on duration period may include any one or more cases in FIG. 5A, FIG. 5B, and FIG. 5C. As shown in FIG. 5A, the sending time is within the on duration period. As shown in FIG. 5B, the sending time partially overlaps with the on duration period. As shown in FIG. 5C, the sending times and the on duration periods are regularly spaced. It should be understood that there may also be another relationship between the sending time and the on duration period. FIG. 5A, FIG. 5B, and FIG. 5C are merely an example for description, and does not constitute a limitation.

Figure 6A:
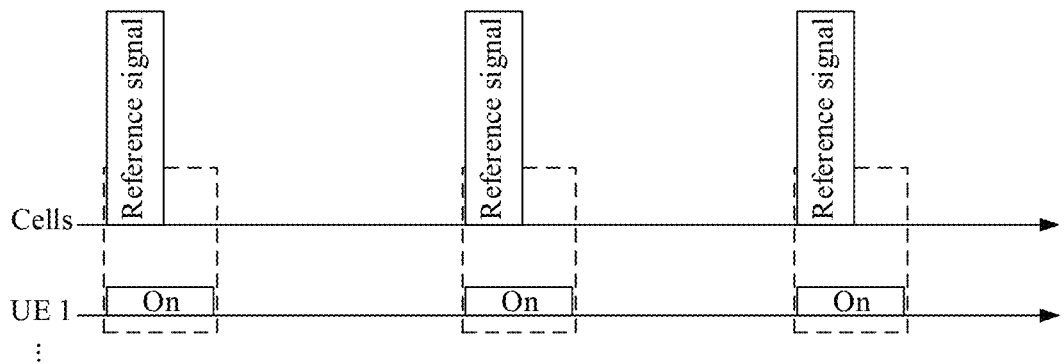
FIG. 6A, FIG. 6B, and FIG. 6C are a schematic diagram in which a sending time of a reference signal is within an on duration period.
Figure 6B:
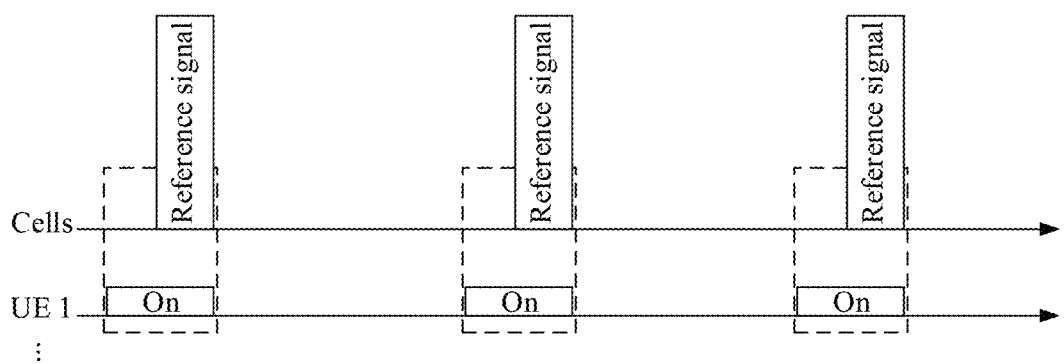
Figure 6C:
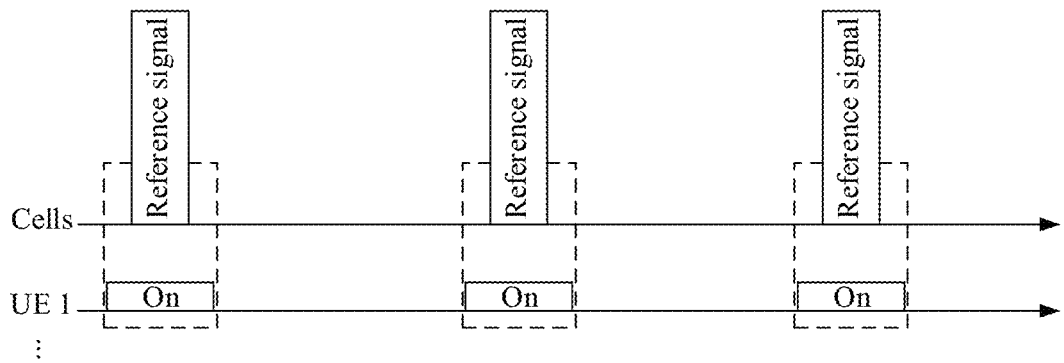

FIG. 6A, FIG. 6B, and FIG. 6C are further refined according to FIG. 5A. FIG. 6A, FIG. 6B, and FIG. 6C are a schematic diagram in which a sending time is within an on duration period. As shown in FIG. 6A, FIG. 6B, and FIG. 6C, that the sending time is within the on duration period includes one or more of the following: FIG. 6A is a schematic diagram in which a start point of the sending time is the same as a start point of the on duration period; FIG. 6B is a schematic diagram in which an end point of the sending time is the same as an end point of the on duration period; and FIG. 6C is a schematic diagram in which a start point of the sending time is after a start point of the on duration period, and an end point of the sending time is before an end point of the on duration period.

Figure 7:
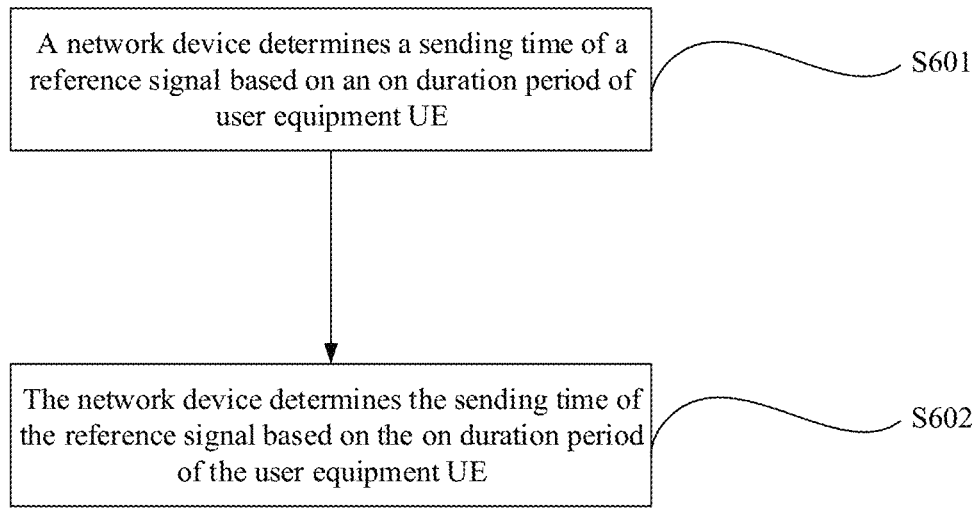
FIG. 7 is a schematic flowchart of determining a sending time according to an on duration period in this application.

FIG. 7 is a schematic flowchart of determining a sending time according to an on duration period in this application. As shown in FIG. 7, the method includes the following steps.

S601. A network device determines a sending time of a reference signal according to an on duration period of user equipment UE.

For example, a serving base station collects statistics on all UEs (the UEs may be DRX UEs, or further, connected mode DRX UEs) for which a CSI-RS needs to be configured, obtains an overlapping on duration period of at least two UEs through calculation according to DRX configurations of the UEs, and configures CSI-RS resources (sending times of reference signals) of a serving cell and a neighboring cell in the overlapping on duration period according to the overlapping on duration period of the UEs that is obtained through calculation.

For example, a serving base station collects statistics on all UEs for which a CSI-RS needs to be configured, groups the UEs according to DRX configurations of the UEs, obtains an overlapping on duration period of each group of UEs through calculation, and configures CSI-RS resources of a serving cell and a neighboring cell of the group of UEs in the overlapping on duration period according to the overlapping on duration period of the group of UEs that is obtained through calculation.

For example, a serving base station collects statistics on all UEs for which a CSI-RS needs to be configured, obtains on duration periods of all the UEs according to DRX configurations of the UEs through calculation, and configures CSI-RS resources of a serving cell and a neighboring cell in all the on duration periods according to the on duration periods of all the UEs that are obtained through calculation.

Optionally, S601 may include: The network device determines the sending time of the reference signal according to the on duration period and a time configuration information table of the reference signal. For example, the time configuration information table of the CSI-RS is shown in Table 1. Time configuration information of the CSI-RS may be an intersection of a CSI-RS subframe configuration and an on duration period of UE.

TABLE 1

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0 to 4 | 5 | $I_{CSI-RS}$ |
| 5 to 14 | 10 | $I_{CSI-RS} - 5$ |
| 15 to 34 | 20 | $I_{CSI-RS} - 15$ |
| 35 to 74 | 40 | $I_{CSI-RS} - 35$ |
| 75 to 154 | 80 | $I_{CSI-RS} - 75$ |

Optionally, the network device obtains an intersection of a sending time in the time configuration information table and the on duration period, and then selects the sending time of the reference signal from the intersection. If the intersection includes a plurality of sending times, the network device may select one or more sending times randomly, periodically, or by comprehensively considering another factor.

For example, according to Table 1, if ICSI-RS=5, it indicates that the CSI-RS is sent starting from subframe 0, and a sending period of the CSI-RS is 5 ms, in other words, the CSI-RS is sent in subframe 0/5/10/15, and the like. The on duration period of the UE that is obtained according to a DRX configuration of the UE includes subframes 5, 6, 7, 8, 9, and 10 that are 6 ms. The intersection is obtained between the sending time in Table 1 and the on duration period of the UE to obtain subframes 5 and 10. In other words, the network device may be configured to send the CSI-RS in subframe 5 and/or 10.

S602. The network device sends the reference signal to the UE at the sending time.

A relationship is established between the sending time of the reference signal and the on duration period of the UE, so that the reference signal is received in the on duration period of the UE as much as possible, to reduce a possibility of reception failure. In addition, the UE does not need to frequently wake up to receive the reference signal, to save power.

The following describes a specific solution for determining an on duration period according to a sending time of a reference signal. A network device configures an on duration period of UE, and sends a configuration result to the UE. After receiving the information, the UE periodically wakes up according to the on duration period configured by the network device, and receives the reference signal at the sending time of the reference signal.

Before the specific solution is described, the on duration period of the UE is first described. The on duration period is determined according to the sending time. Therefore, it is easily understood that the on duration period herein includes on duration periods of all UEs that need to receive the reference signal. Certainly, the UEs may be grouped in this application. In this case, the on duration period is an on duration period of each UE in at least one group of UEs that need to receive the reference signal. For a specific relationship between the on duration period of the UE and the reference signal, refer to descriptions in FIG. 3A, FIG. 3B, FIG. 3C, and FIG. 3D and FIG. 4A, FIG. 4B, FIG. 4C, and FIG. 4D.

After the on duration period of the UE is described, a relationship between the on duration period and the sending time of the reference signal needs to be learned of. The following described method for determining an on duration period of UE according to a sending time is slightly different from the foregoing described method for determining the sending time according to the on duration period of the UE. However, for a specific relationship between the on duration period and the sending time, still refer to FIG. 5A, FIG. 5B, and FIG. 5C and text description in FIG. 5A, FIG. 5B, and FIG. 5C. Details are not described herein again.

It should be noted that a case in which the on duration period of the UE includes the sending time of the reference signal may be essentially consistent with a case in which the sending time is within the on duration period in FIG. 5A. Therefore, for a specific case in which the on duration period of the UE includes the sending time of the reference signal, refer to FIG. 6A, FIG. 6B, and FIG. 6C and text description in FIG. 6A, FIG. 6B, and FIG. 6C. Details are not described herein again.

Figure 8:
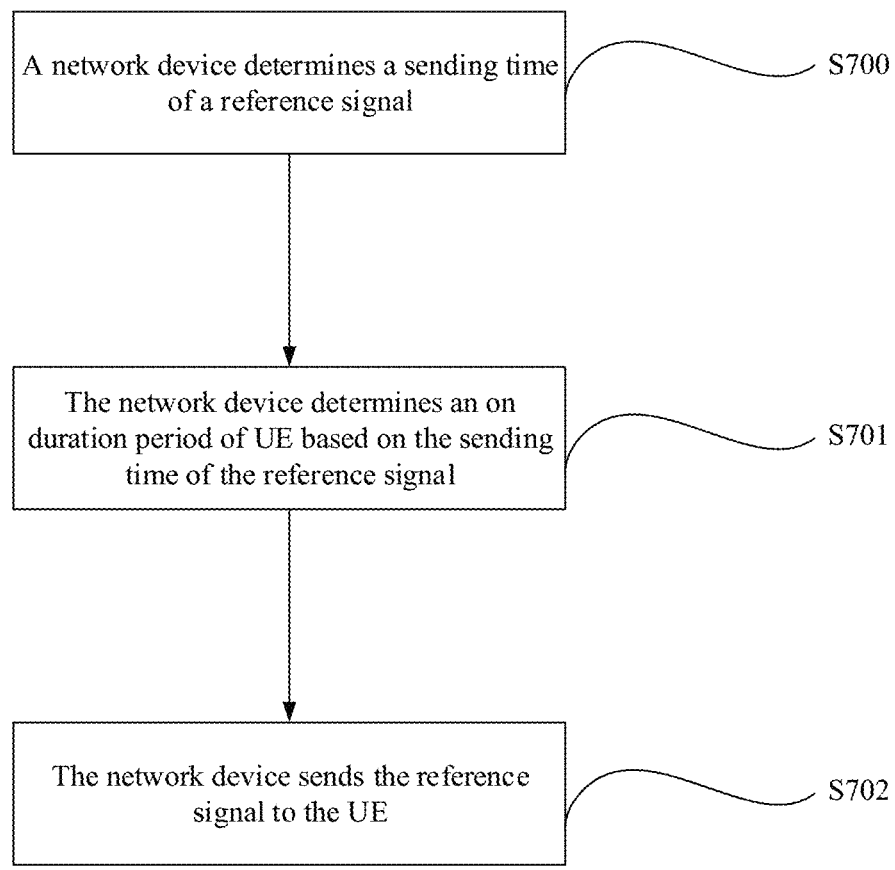
FIG. 8 is a schematic flowchart of a method for determining an on duration period according to a sending time in this application.

FIG. 8 is a schematic flowchart of a method for determining an on duration period according to a sending time in this application. As shown in FIG. 8, the method includes the following steps. S701. A network device determines an on duration period of UE according to a sending time of a reference signal. For example, a serving network device may configure a DRX configuration parameter for each UE or a group of UEs, so that the on duration period includes the following CSI-RS measurement window.

Optionally, before S701, the method further includes the following step: S700. The network device determines the sending time of the reference signal. For example, the serving base station may periodically configure CSI-RS resources of a serving cell and a neighboring cell of each UE or a group of UEs in the CSI-RS measurement window.

S702. The network device sends the reference signal to the UE. The network device sends the reference signal to the UE at the sending time.

Figure 9:
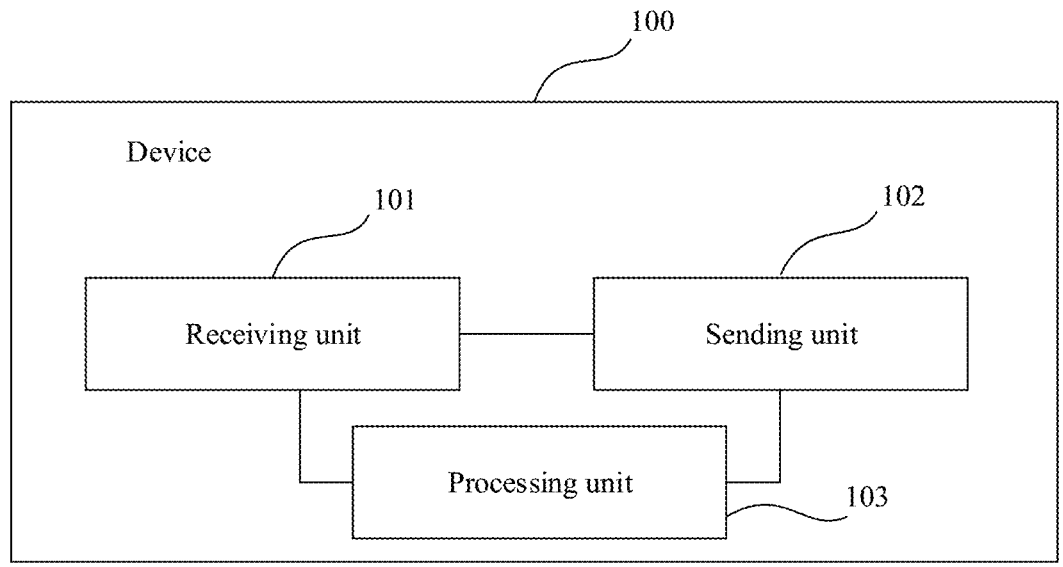
FIG. 9 is a schematic structural diagram of a device 100 in this application.

The network device or the UE in this application is divided into function units below with reference to one or more of the foregoing methods. For example, each function unit may be obtained through division according to each corresponding function, or two or more functions may be integrated into one unit. All or some of the foregoing integrated units may be implemented by using software, hardware, firmware, or any combination thereof. It should be noted that the unit division in this application is an example, and is merely logical function division. There may be another division manner during actual implementation. FIG. 9 is a schematic structural diagram of a device 100 in this application. The device 100 may be applied to a network device or UE that implements this application. Referring to FIG. 9, the device 100 includes a receiving unit 101, a sending unit 102, and a processing unit 103. When the device 100 is configured to implement a function of the network device, the processing unit 103 is configured to determine a sending time of a reference signal according to an on duration period of the user equipment UE, or configured to determine an on duration period of the UE according to a sending time of a reference signal. The sending unit 102 is configured to send the reference signal to the UE. When the device 100 is configured to implement a function of the UE, the receiving unit 101 is configured to: receive configuration information of an on duration period from the network device; and receive, in the on duration period, a reference signal from the network device. It should be understood that with reference to any one or more of the foregoing methods, the network device and the UE may further include more function units for implementing more functions, to associate the sending time with the on duration period, reduce power consumption, and reduce a possibility of reception failure.

When the network device or the UE is implemented in a form of hardware, for a concept, explanation, detailed description, a method, a procedure, a step, and the like that are related to this application and that used in the network device or the UE, reference may be made to descriptions about the content in the foregoing embodiments. In this application, the receiving unit may be implemented by using a communications interface, a receiver, a receiving circuit, or the like. The sending unit may be implemented by using a communications interface, a transmitter, a sending circuit, or the like. It should be understood that functions of the receiving unit and the sending unit may also be integrated together and implemented by a communications interface, a transceiver, and a transceiver circuit. The communications interface is a general term, and may include one or more interfaces.

It may be understood that the foregoing description is only a simplified example of a form of hardware. In actual application, hardware for implementing the network device or the UE is not limited to the foregoing structure, for example, may further include a processor, a memory, an antenna array, a duplexer, and a baseband processing part. The processor may be a central processing unit (CPU), a general purpose processor, a digital signal processor (DSP), an application-specific integrated circuit (ASIC), a field programmable gate array (FPGA) or another programmable logic device, a hardware component, or any combination thereof. Alternatively, the processor may be a combination of processors implementing a computing function, for example, a combination of one or more microprocessors or a combination of a DSP and a microprocessor. The memory may be disposed in the processor, or may independently exist. The duplexer is configured to implement the antenna array and is configured to send and receive signals. The transmitter is configured to implement conversion between a radio frequency signal and a baseband signal. The transmitter may usually include a power amplifier, a digital-to-analog converter, and a frequency converter. The receiver may usually include a low noise amplifier, an analog-to-digital converter, and a frequency converter. The receiver and the transmitter may also be collectively referred to as a transceiver sometimes. The baseband processing part is configured to: process a sent or received signal, for example, layer mapping, precoding, modulation/demodulation, and encoding/decoding, and separately process a physical control channel, a physical data channel, a physical broadcast channel, a reference signal, and the like. In an implementation, it may be considered that functions of the receiver and the transmitter may be implemented by using a transceiver circuit or a dedicated transceiver chip. It may be considered that the processor may be implemented by using a dedicated processing chip, a processing circuit, a processor, or a general-purpose chip. In another implementation, program code used to implement functions of the processor, the receiver, and the transmitter is stored in the memory. The general purpose processor implements the functions of the processor, the receiver, and the transmitter by executing the code in the memory.

Figure 10:
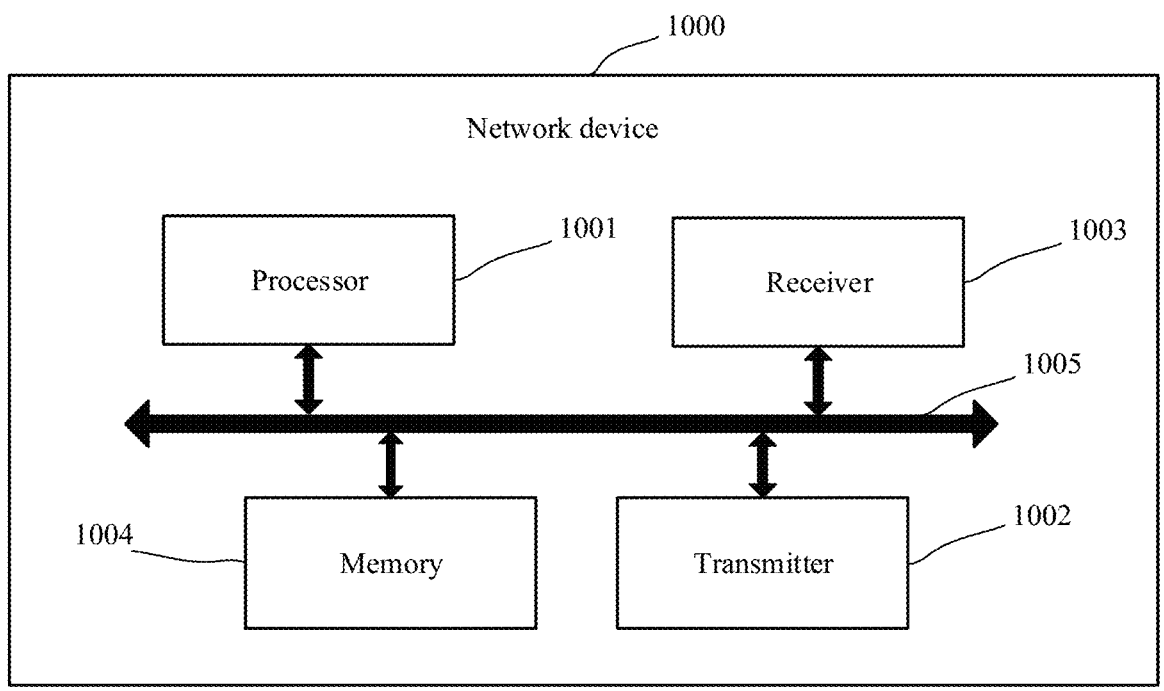
FIG. 10 is a schematic structural diagram of a network device in this application.

For example, for an implementation of the network device, refer to FIG. 10. As shown in FIG. 10, a network device 1000 is provided, and includes a processor 1001, a memory 1004, a receiver 1003, and a transmitter 1002. The receiver 1003 and the transmitter 1002 are configured to communicate with another network element. The memory 1004 is configured to store a program that can be executed by the processor 1001. The program includes an instruction used to implement the methods, the steps, or the procedures described in the foregoing embodiments. For a specific method, procedure, step, beneficial effect, and the like, refer to descriptions about the content in the foregoing embodiments. Details are not described herein again.

Figure 11:
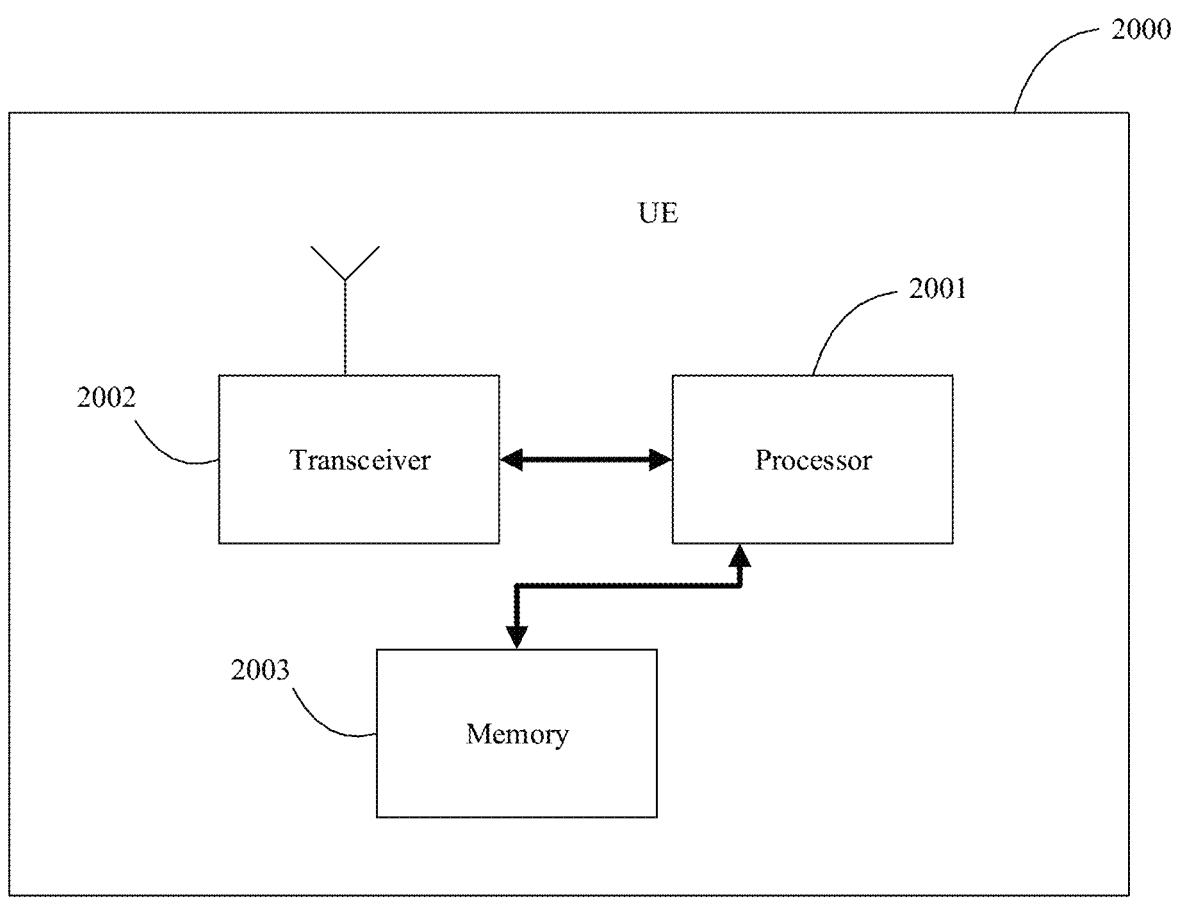
FIG. 11 is a schematic structural diagram of UE in this application.

For example, for an implementation of the UE, refer to FIG. 11. As shown in FIG. 11, UE 2000 is provided, and includes a processor 2001, a memory 2003, and a transceiver 2002. The transceiver 2002 is configured to communicate with another network element (may communicate with the another network element by using an antenna). The memory 2003 is configured to store a program that can be executed by the processor 2001. The program includes an instruction used to implement the methods, the steps, or the procedures described in the foregoing embodiments. For a specific method, procedure, step, beneficial effect, and the like, refer to descriptions about the content in the foregoing embodiments. Details are not described herein again.

When the network device or the UE is implemented by using software, for a concept, explanation, detailed description, and another step that are related to this application and that are used in the network device or the UE, reference may be made to descriptions about the content in the foregoing methods. In this application, some or all of the methods may be implemented in a form of a computer program product. The computer program product includes one or more computer instructions. When the computer program instructions are loaded and executed on a computer, some or all of the procedures or functions in this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semi-conductor medium (for example, a solid state disk Solid State Disk (SSD)), or the like. The storage medium may be integrated in a device, a module, or a processor, or may be separately disposed.

According to the method provided in this application, this application further provides a communications system, and the communications system includes the foregoing network device and UE.

Obviously, a person skilled in the art can make various modifications and variations to this application without departing from the scope of this application. In this way, this application is intended to cover these modifications and variations of this application provided that they fall within the scope of the claims of this application and equivalent technologies thereof.

What is claimed is:

1. An apparatus, comprising:
   one or more processors;
   a non-transitory computer-readable storage medium coupled to the one or more processors and storing program codes to be executed by the one or more processors, the program codes including instructions for:
   determining a sending time of a reference signal according to an overlapping period between a first on duration period of a first user equipment (UE) and a second on duration period of a second UE, wherein the first on duration period and the second on duration period partially overlap in time, and wherein determining the sending time of the reference signal according to the overlapping period between the first on duration period of the first UE and the second on duration period of the second UE comprises:
   determining the sending time of the reference signal according to the first on duration period of the first UE, the second on duration period of the second UE, and a time configuration information table of the reference signal; and sending the reference signal to the UE.

2. The apparatus according to claim 1, wherein determining the sending time of the reference signal according to the first on duration period of the first UE, the second on duration period of the second UE, and the time configuration information table of the reference signal comprises:

obtaining an intersection of a sending time in the time configuration information table, the first on duration period of the first UE, and the second on duration period of the second UE; and selecting the sending time of the reference signal from the intersection.

3. The apparatus according to claim 1, wherein the sending time of the reference signal is within the first on duration period of the first UE.

4. The apparatus according to claim 3, wherein the sending time of the reference signal being within the first on duration period of the first UE comprises:

a start point of the sending time of the reference signal is the same as a start point of the first on duration period of the first UE;

an end point of the sending time of the reference signal is the same as an end point of the first on duration period of the first UE; or the start point of the sending time of the reference signal is after the start point of the first on duration period of the first UE, and the end point of the sending time of the reference signal is before the end point of the first on duration period of the first UE.

5. The apparatus according to claim 1, wherein the reference signal is a channel state information reference signal (CSI-RS).

6. The apparatus according to claim 1, wherein the first UE is in a discontinuous reception mode.

7. An apparatus, comprising:

one or more processors;

a non-transitory computer-readable storage medium coupled to the one or more processors and storing program codes to be executed by the one or more processors, the program codes including instructions for:

grouping a plurality of user equipment (UEs) served by the apparatus into groups according to discontinuous reception configurations of the plurality of UEs;

for each group of UEs, determining an on duration period of UEs in the group according to a sending time of a reference signal; and for each group of UEs, sending the reference signal to the UEs in the group.

8. The apparatus according to claim 7, wherein for each group of UEs, the on duration period of the UEs in the group comprises:

an on duration period of at least one of all UEs in the group that need to receive the reference signal.

9. The apparatus according to claim 7, wherein for each group of UEs, determining the on duration period of the UEs in the group according to the sending time of the reference signal comprises:

for each group of UEs, determining that the sending time of the reference signal is within the on duration period of the UEs in the group.

10. The apparatus according to claim 9, wherein the sending time of the reference signal being within the on duration period of the UEs in the group comprises:

an end point of the on duration period of the UEs in the group is the same as an end point of the sending time.

11. The apparatus according to claim 7, wherein the program codes further include instructions for:

for each group of UEs, determining the sending time of the reference signal.

12. The apparatus according to claim 11, wherein for each group of UEs, determining the sending time of the reference signal comprises:

for each group of UEs, periodically configuring the sending time of the reference signal.

13. The apparatus according to claim 7, wherein the reference signal is a channel state information reference signal (CSI-RS).

14. The apparatus according to claim 7, wherein the plurality of UEs are in a discontinuous reception mode.

15. An apparatus, comprising:

one or more processors;

a non-transitory computer-readable storage medium coupled to the one or more processors and storing program codes to be executed by the one or more processors, the program codes including instructions for:

collecting statistics for all UEs served by the apparatus for which a reference signal will be configured;

grouping the UEs into groups according to discontinuous reception configurations of the UEs;

for each group of UEs, obtaining an overlapping on duration period in which all UEs in the group are in an duration period;

for each group of UEs, configuring a reference signal to be sent to the UEs in the group in the overlapping on duration period; and for each group of UEs, sending the reference signal to the UEs in the group in the overlapping on duration period.

16. The apparatus according to claim 15, wherein the reference signal is a channel state information reference signal (CSI-RS).

* * * * *